Figure 1:
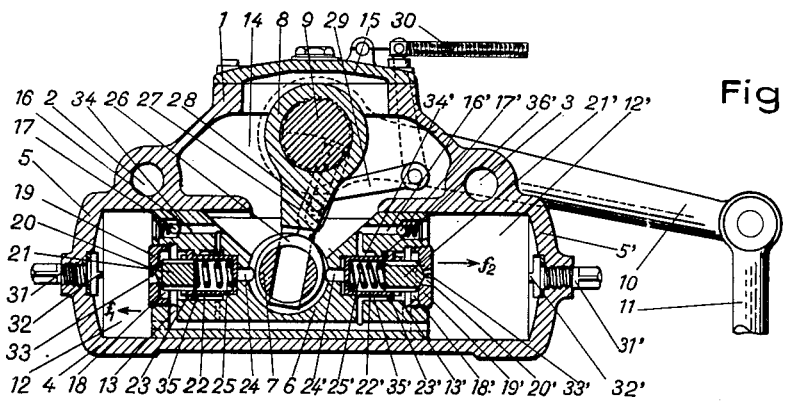

July 10, 1951   M. KATZ   2,559,632
HYDRAULIC DEVICE FOR DAMPING OSCILLATIONS FOR
SPRING SUSPENSIONS OF VEHICLES AND THE LIKE
Filed Aug. 13, 1948   2 Sheets-Sheet 1

INVENTOR
Maurice Katz
BY
Cameron, Kerkam, & Sutton
ATTORNEYS

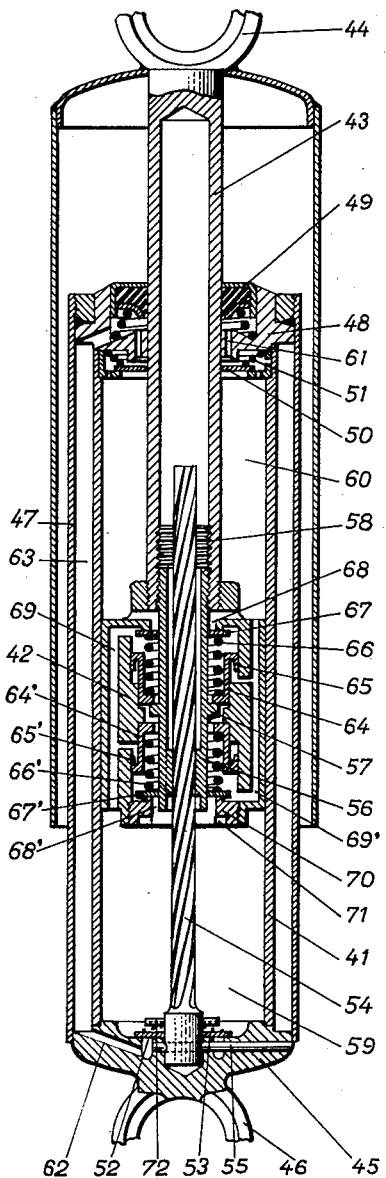
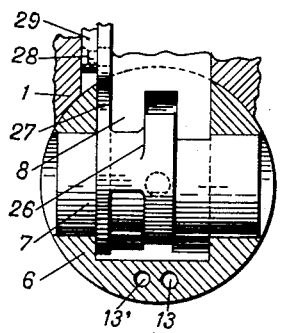
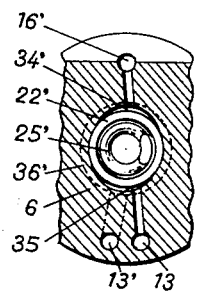

Patented July 10, 1951

2,559,632

UNITED STATES PATENT OFFICE 2,559,632

HYDRAULIC DEVICE FOR DAMPING OSCILLATIONS FOR SPRING SUSPENSIONS OF VEHICLES AND THE LIKE

Maurice Katz, Neuilly-sur-Seine, France

Application August 13, 1948, Serial No. 44,054
In France December 31, 1947

21 Claims. (Cl. 188—88)

This invention relates to a device for damping oscillations in spring suspensions of automotive vehicles or any similar system, which device effects a damping of the movements of the suspended mass with constant intensity, the value of the said damping being determined by the amplitude of the displacement of the movable member connected to the element which receives the shock.

It is known, in fact, that such suspensions have a more gentle action in proportion as the accelerations are smaller. The damping efficiency is at a maximum and the acceleration at a minimum when the resistance set up by the damping device is constant throughout the entire movement. When the value of this resistance is equal, for example, to one half of the tension attained by the spring of the suspension, the return to the position of equilibrium can then take place even without exceeding this position.

One object of the invention is that the movable member shall not be braked in its first movement on either side of the position of equilibrium so that only the minimum efforts are transmitted to the suspended mass in order that the amplitude of the displacement of the said suspended mass may not be increased.

Another object of the invention consists in providing simple adjusting means whereby, for example, the damping devices can be readily applied to vehicles having very different characteristics from one another, or they can be better adapted to the same vehicle according to the state of the road or the load carried.

A damping device according to the invention is characterised in that it comprises means for damping, the value of which is determined by the amplitude, that is to say the extreme position reached by the piston or other part of the damping device in one movement and means which maintains throughout the duration of the following movement, which takes place in the opposite direction, the value of the damping thus fixed, said means being in addition combined with suitable adjusting members by means of which the degree of increase of damping with the amplitude can be modified during running.

To this end, the improved damping device is of the type comprising a space filled with liquid and situated in a cylinder integral with one of two parts connected by springs, said space being divided into two principal chambers by a piston which is coupled to the other of the said two parts and which, under the action of its displacements with respect to the cylinder, forces the liquid from one chamber into the other through ducts controlled by valve devices. The device is characterised in that the valve device is balanced in each of its positions corresponding to the various values of the pressure opposing the return of the piston regardless of the said values, these positions being automatically adjusted in dependence upon the stroke of the said piston, and in that whatever may be the value of this pressure, the position of the valve device and the loading of the valve are maintained during the return movements towards the normal inoperative position, as a result of which the damping device offers to this return movement a constant resistance, the value of which is proportional to the amplitude of the displacement undergone by the piston from its inoperative position.

The vibration of the valve device thus balanced can be avoided by subjecting one of the extremities of the loading spring to a supplementary frictional force. This force can be obtained by any known mechanical means. It can be effective constantly or only during the operation of the valve device. In the latter case, it can be obtained by the action of the pressure created. This supplementary frictional force, applied to that extremity of the spring which is opposite to the valve, can naturally assist in maintaining the latter in position, and the obturating surface of the valve can then be different from that of the valve device but balanced pressures can still be obtained.

The means which transmits the displacement of the members connected by the deformable resilient element to the movable extremity of the spring by which the valve controlling the passage of the liquid is loaded, can be driven by any part participating in the movement. This means can advantageously be housed in the damping device itself, and in this case it may comprise a cam immovably mounted on a rotating member or one which itself rotates through a variable angle which is adjustable from the outside during operation.

It may also advantageously comprise one or more springs bearing on a fixed part of the damping device. The said spring or springs may be readily interchangeable in the inoperative position to enable the damping device to be better adapted to the system, the movements of which it is desired to damp. In other cases, the said means may advantageously be constituted by a helicoidal rod combined with a suitable screw and nut, or by a rod having a variable section, which co-operates with a system of levers for the purpose of reducing the displacements.

The said means may also take the form of a hydraulic thrust member, for example one in which the piston having a small orifice and actuated by a movable part of the damping device would, regardless of the mean position of equilibrium at the time, allow the spring by which the valve-member is loaded to resume its inoperative tension and then to increase this tension as a function of the amplitude during the normal movements which take place at speeds which are too high for the small orifice formed to allow the passage of an appreciable quantity of liquid in order to prevent the cylinder from being driven in the movement.

The increase in the resistance of the damping device may follow a given law in each direction of movement or may manifest itself only in one direction.

Figure 2:
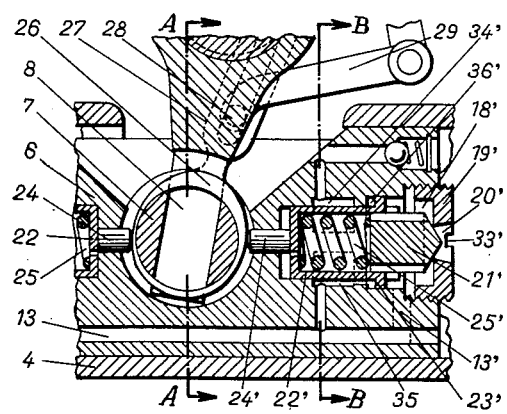
Figure 5:
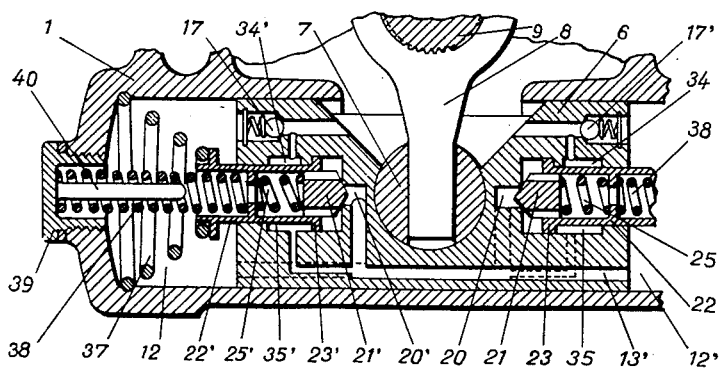

Three examples of embodiment of the invention as applied to damping devices for automotive vehicles are illustrated in the accompanying drawings, in which:

Figure 1 is a longitudinal section of a damping device actuated by the oscillating motion of a connecting rod, Figure 2 shows on a larger scale the central part of Figure 1, Figure 3 is a cross sectional view of the piston on the line A—A of Figure 2, Figure 4 is a fragmentary sectional view of the piston on the line B—B of Figure 2, Figure 5 is a fragmentary longitudinal section of a modification, and Figure 6 is a longitudinal section of a modification relating to a telescopic damping device of the direct-action type.

In the example of embodiment shown in Figures 1 to 4, the damping device comprises essentially a body 1 secured to the chassis of the vehicle by means of bolts extending through holes 2 and 3, there being formed in the said body a cylinder 4 closed at both ends by covers 5 and 5'. Movably disposed inside the cylinder 4 is a double-acting piston 6 driven by means of a barrel 7 into which there slides a finger 8 connected to a shaft 9 which receives movement through a connecting rod 10 which is in turn connected by a rod 11 to the axle of the vehicle.

The piston 6 divides the cylinder 4 into two chambers 12 and 12' which communicate with one another through two ducts 13 and 13' disposed symmetrically in the piston 6. A chamber 14 formed in the upper portion of the body 1 and closed by a cover 15 contains reserve liquid which passes through channels 16 and 16' and through ball valves 17 and 17' into the chambers 12 and 12' to compensate for leakages which occur therein during the movements of compression.

The piston 6 has in its two faces recesses 18 and 18' provided with two diaphragms 19 and 19', the orifices 20 and 20' at the centers of which are normally closed by valve-members 21 and 21' sliding inside sleeves 22 and 22' which have at their outer ends flanges 23 and 23' and at their inner ends stems 24 and 24'. Two calibrated springs 25 and 25' force the valve-members 21 and 21' constantly on to their seats 20 and 20' and at the same time the stems 24 and 24' on to a cam 26 which is connected to a guide fork 27 and rotates on the barrel 7. A stud 28 secured to a link 29 and driven from the outside by means of a sheathed cable, is engaged between the arms of the fork 27 and causes the said fork, and consequently the cam 26, during the translational movement of the piston 6, to rotate through an angle which will thus depend upon the position imparted to the link 29.

Two screws 31 and 31' accessible from the outside and having projecting keys 32 and 32' are adapted to engage in grooves 33 and 33' in the diaphragms 19 and 19', so that when the piston 7 is moved to one of its extreme positions it is possible to screw the corresponding diaphragm to a variable extent and thus to adjust the initial tension the springs 25 and 25'.

Formed in the body of the piston 6 above the cylindrical parts of the sleeves 22 and 22' are spaces 34 and 34' which communicate only with the chamber 14 which is at atmospheric pressure, and below the said cylindrical parts there are two other spaces 35 and 35' which communicate on the one hand with chambers 12 and 12' respectively and on the other hand with annular spaces 36 and 36' respectively which are created by the displacements of the sleeves 22 and 22' between their flanges 23 and 23' and the cylindrical walls of the recesses 18 and 18'.

This damping device operates in the following manner:

Under the action of a shock transmitted by the axle of the vehicle, the piston 6 moves, for example from its central inoperative position, towards the left of Figure 1 as indicated by the arrow $f_1$. The liquid contained in the chamber 12 passes relatively freely through the central orifice 20 and the duct 13 into the chamber 12', lifting the valve-member 21 which is very lightly loaded by the spring 25, the weak initial tension of which is not varied during this movement by the rotation of the cam 26. This first movement thus takes place without the damping device offering any appreciable resistance.

However, the cam 26, in rotating, pushes against the stem 24', of the sleeve 22', which moves and compresses the spring 25', the load of which on the valve-member 21' progressively increases as the piston 6 approaches the end 5, that is to say, as the amplitude of the movement increases. Owing to leakage which may occur around the piston 6, some of the liquid forced from the chamber 12, instead of passing directly into the chamber 12', may escape towards the chamber 14, but from there the atmospheric pressure will force an equivalent quantity through the duct 16' and the ball valve 17' into the chamber 12', which will thus always be completely filled.

During the return movement which takes place in the direction of the arrow $f_2$, the liquid which passes from the chamber 12' into the chamber 12 through the central orifice 20' and the duct 13', is obliged to lift the valve member 21' and to overcome the increased tension of the spring 25'. Consequently, its pressure is very high and the damping device offers great resistance to this return movement. The pressure of the liquid which is also exerted in the duct 13, without the said duct allowing any passage of liquid, also manifests itself in the annular chamber 36' which communicates with the duct 13. The action of the said pressure on the flange 23', which is of substantially equal surface to the central orifice 33', has the effect of maintaining the sleeve 22' in its initial position in spite of the progressive retraction of the cam 26, and thus of maintaining the tension of the spring 25' at a value corresponding to the maximum amplitude attained during the preceding movement.

The pressures which balance one another on either side of the spring 25' are equal to the tension of the said spring regardless of any variation in the value of the said tension, which is determined by the extreme position of the cam 26. Thus, during return, the damping device offers constant resistance, the value of which is automatically predetermined by the amplitude, and therein resides the fundamental object of the invention.

The maintenance of the sleeve 22' in position against the action of the spring 25', and regardless of the retraction of the cam 26, can also be effected by a mechanical or frictional locking action, but it is preferable having regard to the rapid wear of the parts in this form of embodiment, to employ these means only in association, with that hereinbefore described and to combat very weak secondary forces resulting, for example, from vibrations of the valve member 21'.

For this purpose, the sleeve 22', which is subjected to the atmospheric pressure of the chamber 14 on one part of its upper wall through the space 34', is held with friction against the other part of its upper wall by the pressure of the chamber 12' which obtains in the space 35' situated below the said sleeve 22'. As soon as the movement stops, the pressure in the chamber 12' is cancelled out and with it there also disappear the pressures in the annular space 36' and in the space 35' so that the sleeve is released and returned into contact with the cam 26 through the stem 24'.

If the movement stops in the normal position of equilibrium of the suspension, the oscillation is completely damped and another movement will take place only when a further shock occurs, and this other movement will then be in one direction or the other as hereinbefore described.

If, on the other hand, the position of equilibrium has been exceeded in the return movement, the sleeve 22 will in turn come into action in order to brake the following movement with a constant force, the value of which is proportional to the amplitude and so on until the oscillation has been completely damped out.

However, it is preferable that the suspension should return to its position of equilibrium without exceeding it, that is to say after a single half-oscillation. Having regard to the variations in the suspended weight, the speed of the vehicle and the state of the road, this result would be difficult to obtain if the cam 26 were fixed to the barrel 7. On the other hand, the cam 26, which is integral with the barrel 7 in its translational movement only, but is dependent in its rotational movement upon the adjustable position of the stud 28, enables the driver during running to effect, from his seat, by means of the sheathed cable 30 a smaller or greater angle of rotation of the cam 26 with respect to the displacement of the piston and thus to impart to the damping device a resistance which is better adapted to the momentary conditions of operation of the suspension.

The profile of the cam, whether it is fixed or adjustable, can naturally be designed in any desired manner and in particular in such a manner as to impart to the end of the lever 10 a braking effort which is proportional to the variable flexibility of the suspension spring. A boss on the lower portion of the cam can, in addition, be provided to increase rapidly at the end of the stroke of the piston 6 the tension of the springs 25 and 25', or of one of these springs only, and thus to increase substantially the resistance of the damping device towards the end or ends of its vibratory motions in order to avoid, for example, bumping on the suspension springs in the event of an exceptionally severe shock.

If the piston 6 is forced to the end 5 of the cylinder 4 by means of the lever 10, it is possible by unscrewing the screw 31 to engage its key 32 in the groove 33 of the diaphragm 19 and to screw this diaphragm more or less into the body of the piston 6, if necessary by repeating the operation several times, and thus to adjust the initial tension of the spring 25 in order to adapt the resistance of the damping device to the weight of the vehicle without having to dismantle the said damping device.

Figure 5 shows a modification in which the initial tension of the springs 25 and 25' of the valves 21, 21' are not obtained by the rotation of a key but by means of one or more springs, such as 37 and 38, at least one of which, for example the spring 38, which bears against a plug 39 provided with a guide rod 40, can readily be exchanged. In this way, it is possible in particular by suitably selecting the length of the spring 38 to adjust the initial tension of the spring 25' by which the valve-member 21' is loaded and also to vary the constant resistance of the damping device as a function of the amplitude attained, by a judicious choice of the diameter of the spring 38 and of the section of the wire thereof.

A calibrated spring of this nature could be designated directly in values of the weight of the vehicle in question, thus facilitating the application of the same type of damping device to different vehicles without any adjustment, which is always a delicate matter and within the ability of a few specialists only. The spring 37, of suitable form, could supply an additional thrust to modify the law of variation of the tension of the spring 25' as a function of the amplitude, for example to enable the resistance of the damping device to follow a law of variation proportional to the variable flexibility of the principal spring of the suspension, or again to compensate for the variations of the forces resulting from the disposition of the connecting members.

In other respects, the damping device operates in a similar manner to that described in the preceding example. It will, however, be noticed that the valve-member 21' co-operating with the chamber 12' is situated on the opposite side of the piston from the said chamber 12' and similarly the valve member 21, which is situated on the right-hand side of Figure 5, co-operates with the chamber 12 situated on the left-hand side of Figure 5, whereas in the preceding example (Figure 1) the valve-members 21 and 21' are situated on the same side as the chambers 12 and 12' with which they co-operate.

Finally, in Figure 6 there is shown a modified application of the invention to a telescopic damping device of the direct action type. This damping device is constituted by a cylinder 41 in which there slides a piston 42 which receives through a rod 43 the movement of the suspended mass secured to an attachment 44. The cylinder 41 rests on a base 45 integral through an attachment 46 with the axle supporting the wheel of the vehicle.

A cylinder 47, concentric with and of greater diameter than the cylinder 41, is secured at the bottom to the same base 45 and supports at its upper part a fluid-tight closing member 48 in which the rod 43 supporting the piston 42 slides freely and in fluid-tight fashion by reason of packing 49.

The cylinder 41 has at its upper part a valve-member 50 maintained open in the inoperative position by a spring 51 and, at its lower part, a valve-member 52 maintained closed in the inoperative position by a small spring 53.

A rod 54 having helical grooves or a very large-pitched screw mounted on the base 45 by means of a pin 55 slides in a nut 56 supporting a ring 57 and causing the said ring to be screwed or unscrewed in the screw-threaded portion 58 of the rod 43. The pitches of the rod 54 and of the screw-threaded portion 58 are of opposite direction to one another.

The piston 42 divides the cylinder 41 into two chambers 59 and 60 which are able to communicate through orifices 61 and 62 respectively with the compensating chamber 63 formed by the cylinders 41 and 47.

Slidably disposed inside the piston 42, as previously described, are two sleeves 64 and 64' having flanges 65 and 65' and forcing springs 66 and 66' bearing on valve members 67 and 67' which control the passage of liquid between the chambers 59 and 60 through central orifices 68 and 68' and ducts 69 and 69'. The flanges 65 and 65' have the form of a narrowed lip which is slightly extensible so that it can be held with friction against the cylindrical walls by the pressure. The flanges can be constituted also by separately fitted cup-shaped members of rubber or any other material. They may be provided with resilient packing segments.

A threaded ring 70 in which the central orifice 68 is situated can be screwed into the piston 42 when the piston is in its lower end position and its grooves 71 are engaged by a pin 72 extending through the lower part of the rod 54.

This damping device operates in the following manner:

When the wheel travelling over the ground encounters a bump, an upward movement of the axle takes place which tends to compress the damping device from the mean position of equilibrium, that is to say, the piston 42 descends towards the base 45. The liquid contained in the chamber 59 then passes readily into the chamber 60 through the central orifice 68' and the conduit 69', after having lifted without any great effort the valve member 67' which is lightly loaded by the initial tension of its spring 66'. No appreciable resistance is then offered to this movement apart from the spring of the suspension which undergoes deflection.

The nut 56 sliding on the non-rotating helical rod 54 undergoes a movement of rotation as the result of which it becomes screwed in the screw-threaded portion 58 of the rod 43 and moves upwardly with respect to the piston 42 by an amount proportional to the maximum amplitude attained by the axle of the vehicle.

The ring 57 of the nut 56 carries along the sleeve 64 in its translational movement while compressing the spring 66 by which the upper valve member 67 is loaded.

The excess liquid in the chamber 60, owing to the inward movement of the rod 43, passes freely through the orifices 61 into the compensating chamber 63, its weak flow not being able to close the valve member 50 against its spring 51.

When the deflected spring of the suspension expands following upon the cessation of the movement of compression and thus produces a movement of extension of the damping device, the piston 42 first rises rapidly away from the base 45. Under the action of the intense and rapid flow of the liquid, the valve member 50 immediately closes the orifices 61 and the liquid contained in the chamber 60 can only escape through the orifice 68 and the duct 69, after having lifted the valve member 67, which is heavily loaded by its spring 66, which results in increased pressure in the chamber 60. The resistance afforded by the damping device to this return movement is therefore greater in proportion as the load of the spring 66 is higher, that is to say, as the amplitude of the preceding movement was greater. Moreover, this increased resistance is maintained as its initial value throughout the entire return movement because the pressure in the chamber 60 is also exerted on the flange 65 of the sleeve 64. The surface of this flange 65 being substantially equal to that of the valve member 67 exposed to the same pressure, the whole is then in equilibrium regardless of the value of the said pressure, which is then solely determined by the tension of the spring 66, that is to say, the amplitude of the preceding movement. The sleeve 64 forming a support for the spring 66 therefore remains in positions throughout the entire expansion in spite of the retraction of the ring 57 of the nut 56 which, being driven by the helical rod 54, now moves downwards with respect to the piston 42.

The sleeve 64 cannot resume its normal inoperative position until the pressure which is exerted on the inner face of its flange 65 through the duct 69' has ceased, that is to say, when the movement has stopped.

The sleeve 64 could also be maintained in position by a frictional force resulting, for example, from the pressure exerted on the narrow lip of its flange against the cylindrical wall, and this flange can then be advantageously formed by a rubber cup-shaped member forming one of its extremities, while the said flange itself can be completely dispensed with. However, it has been preferred to combine the two means and to use the latter only to prevent vibratory movements of small intensity which may occur on the sleeve 64, having regard to the risk of wear thereof. The liquid in the compensating chamber 63 will pass through the orifice 62 into the chamber 59, lifting the valve member 52 without difficulty.

In the opposite direction, should the wheel encounter a hole on the road and first of all produce a movement of extension of the damping device, this movement will not be substantially braked so that the adherence of the wheel will be completely maintained and the drop of the vehicle which will follow will be not only attenuated but will be greatly damped by the damping device, the resistance of which to compression will increase considerably due to the entry into action of the sleeve 64' which will have compressed, in the preceding movement, the spring 66' by which the valve member 67' is loaded, as has hereinbefore been described with reference to the sleeve 64.

The initial tension of the spring 66' can be adjusted by moving the piston 42 to the base 45 so as to engage the pin 72 in the grooves 71 in the ring 70. Rotation of the whole upper movable assemblage, which is normally fixed by the attachment 44 to the vehicle without being able to turn with respect to the whole lower assemblage fixed by the attachment 46 to the axle, is sufficient to screw the ring 70 to a variable extent into the body of the piston 42 in order to obtain the desired initial tension of the spring 66'. Similar means may be envisaged for adjusting the initial tension of the upper spring 66. The relative position of the nut 56 to the sleeves 64 and 64' can similarly be modified by rotation of the said two assemblages in any position of extension of the damping device. The latter means affords in particular the possibility of adjusting the initial tensions of either of the springs 66 and 66' with respect to the mean position of equilibrium of the suspension.

The helical rod 54 can also be replaced by a smooth rod of variable section which acts in the manner of a straight cam so as to transmit to the springs 66 and 66' through toggle levers or any other suitable member a compressive force dependent upon the stroke of the piston 42.

The ducts for the passage of the liquid, the obturating devices thereof and the devices by which they are loaded and which maintain them in position and regulate the action thereof, could be disposed otherwise than in the pistons, for example in the body of the damping device or a supplementary member connected by suitable ducts to the damping device.

Various other modifications can be made in the examples of embodiment without departing from the invention.

Having now particularly described and ascertained the nature of my said invention and in what manner the same is to be performed, I declare that what I claim is:

1. A hydraulic device for damping oscillations comprising a cylinder, a piston movable axially in said cylinder and dividing it into two liquid chambers, ducts providing a relatively unrestricted passage through said piston during its initial stroke from neutral position, and means for opposing return movement of said piston by a substantially constant liquid pressure the value of which is adjusted in accordance with the amplitude of said initial stroke comprising a check valve for stopping reverse flow through said passage, ducts providing a passage by-passing said check valve, a loaded valve restricting the flow in said bypass passage, means responsive to movement of said piston from neutral position for progressively increasing the valve loading in proportion to the amplitude of the initial piston stroke, and means maintaining said increased valve loading during return movement of the piston to neutral position.

2. A hydraulic device for damping oscillations comprising a cylinder, a piston movable axially in said cylinder and dividing it into two liquid chambers, ducts providing a relatively unrestricted passage through said piston during its initial stroke from neutral position, and means for opposing return movement of said piston by a substantially constant liquid pressure the value of which is adjusted in accordance with the amplitude of said initial stroke comprising a check valve for stopping reverse flow through said passage, ducts providing a passage bypassing said check valve, a valve restricting the flow in said bypass passage, a valve loading device movable relative to said valve, a loading spring interposed between said valve and device, means responsive to movement of said piston from neutral position for moving said device progressively toward said valve and compressing said spring in proportion to the amplitude of the piston stroke, and means retaining said device substantially in its extreme adjusted position during return movement of said piston to neutral position.

3. A device as defined in claim 2, said means for moving the valve loading device including a cam movable simultaneously with said piston and cam-actuated means engaging said device.

4. A device as defined in claim 2, said means for moving the valve loading device including a spring interposed between said device and a fixed point of said cylinder.

5. A device as defined in claim 2, said means for moving the valve loading device including a rod connected to the cylinder and passing slidably through the piston, and motion-transmitting means actuated by relative movement between said rod and piston and engaging said loading device.

6. A device as defined in claim 5, said motion-transmitting means comprising a nut threaded internally on said rod and externally in a part of said cylinder, whereby said nut moves axially as said piston is displaced in said cylinder, and means transmitting the axial movement of said nut to said loading device.

7. A device as defined in claim 2, said retaining means comprising a pressure surface on said loading device, and duct means connecting said surface with the chamber in which said opposing pressure is generated to oppose the expansion of said loading spring.

8. A device as defined in claim 2, said retaining means comprising a friction surface on said loading device having sliding engagement with said piston.

9. A device as defined in claim 2, said loading device being slidable in a bore in said piston and said retaining means comprising pressure chambers formed between said device and the piston on opposite sides of said device, and means connecting one of said pressure chambers with one of said liquid chambers and the other pressure chamber being connected with the other liquid chamber.

10. A hydraulic device for damping oscillations comprising a cylinder, a piston movable axially in said cylinder and dividing it into two liquid chambers, said piston having recesses on both sides, diaphragm members for the open ends of said recesses and each having a valve orifice opening into its adjacent liquid chamber, a valve in each recess for obturating its orifice opening, a valve loading device slidable in each recess, a loading spring interposed between each loading device and its valve, ducts connecting each recess with the liquid chamber on the other side of the piston, whereby the initial stroke of the piston in either direction from neutral position is opposed by a pressure corresponding to the initial loading of the valve on that side of the piston toward which it moves, means responsive to movement of the piston during said initial stroke for moving the other loading device on the opposite side of the piston progressively outward toward its valve, thereby progressively compressing the spring and increasing the loading of the other valve by an amount proportional to the amplitude of said initial stroke, and means retaining said other loading device substantially in its extreme adjusted position during return movement of said piston to neutral position.

11. A device as defined in claim 10, said diaphragm members being threaded in said recesses and having outer grooves, and key members rotatably mounted in the ends of the cylinder and adapted to engage said grooves when the piston is moved to its extreme positions for rotating said diaphragm members and adjusting the initial loading of said valves.

12. A device as defined in claim 10, said loading devices having stems extending inwardly toward one another, a cam interposed between said stems, and means actuated by movement of said piston for moving said cam to move said other loading device outward.

13. A device as defined in claim 12, said cam being rotatably mounted on said piston and having a radial arm, and a stop fixed with respect to movement of said piston during its initial stroke and engaging said arm to rotate said cam.

14. A device as defined in claim 13, said stop position being adjustable to vary the amount of cam rotation for a given amplitude of said initial stroke.

15. A device as defined in claim 10, comprising a tubular nut member having external threaded engagement with a part of said piston, a rod connected to the cylinder and extending into and having threaded engagement with said nut member, whereby said nut member moves axially relative to said piston as said piston moves axially in said cylinder, and means on said nut member for engaging and moving said loading devices.

16. A hydraulic device for damping oscillations comprising a cylinder, a piston movable axially in said cylinder and dividing it into two liquid chambers, said piston having recesses on both sides and each recess being connected by ducts through the piston with the liquid chamber on the opposite side of the piston, each recess having orifice means through which liquid may pass from one liquid chamber through said ducts to the opposite liquid chamber, valves for obturating said orifices, valve loading devices slidable in said recesses, loading springs interposed between said loading devices and valves, whereby the initial stroke of the piston in either direction from neutral position is opposed by a pressure corresponding to the initial relatively light loading of one of said valves, means responsive to movement of the piston during said initial stroke for moving the loading device of the other valve progressively toward said other valve, thereby progressively compressing its spring and increasing the valve loading by an amount proportional to the amplitude of said initial stroke, and means retaining said other loading device substantially in its extreme adjusted position during return movement of said piston to neutral position.

17. A device as defined in claim 16, said valves being movable inwardly in their recesses to orifice-obturating positions, said loading devices being located outwardly with respect to their respective valves, and springs interposed between said loading devices and the ends of the cylinder for moving the loading device on that side of the piston toward which the piston moves during its initial stroke to increase the loading of the respective valve.

18. A hydraulic device for damping oscillations comprising a cylinder, a piston movable in said cylinder and dividing it into two liquid chambers, duct means connecting the opposite ends of the cylinder for passage of liquid therebetween in accordance with the movements of said piston, valve means for restricting the flow of liquid through said ducts and creating pressure in said chambers opposing the return movement of said piston toward normal inoperative position, said valve means being adjustable by said piston, as it moves away from said normal position, to vary the restriction of flow by an amount corresponding to the amplitude of the piston stroke, and means for subjecting said valve means to the liquid pressure opposing the return stroke of the piston for balancing the pressure of the restricted flow and maintaining said valve means in adjusted position during said return stroke.

19. A device as defined in claim 18, said valve means comprising a duct-obturating valve, a loading device movable relatively to the valve by said piston, and a loading spring interposed between said device and valve, said device and valve being subjected to the liquid pressure acting in opposite directions during the return stroke of the piston to maintain a substantially constant spring loading on the valve.

20. A hydraulic device for damping oscillations comprising a cylinder, a piston movable in said cylinder and dividing it into two liquid chambers, duct means through said piston for passage of liquid between said chambers as said piston moves in either direction from its normal inoperative position, valve means carried by said piston for restricting the flow through said duct means as said piston returns to its normal position, said valve means being adjustable by said piston, as it moves away from normal position, to vary the restriction of flow by an amount corresponding to the amplitude of the piston stroke, and means for subjecting said valve means to the liquid pressure opposing the return stroke of the piston for balancing the pressure of the restricted flow and maintaining said valve means in adjusted position during said return stroke.

21. A device as defined in claim 20, said valve means comprising a duct-obturating valve, a loading device movable relative to the valve by said piston, and a loading spring interposed between said device and valve, said device and valve being subjected to the liquid pressure acting in opposite directions during the return stroke of the piston to maintain a substantially constant spring loading on the valve.

MAURICE KATZ.

REFERENCES CITED

The following references are of record in the file of this patent:

UNITED STATES PATENTS

| Number | Name | Date |
| --- | --- | --- |
| 2,106,461 | Leslie | Jan. 25, 1938 |
| 2,244,501 | Pierce | June 3, 1941 |
| 2,309,499 | Chenault | Jan. 26, 1943 |
| 2,352,063 | Zenz | June 20, 1944 |
| 2,379,750 | Rossman | July 3, 1945 |
| 2,412,533 | Petrie | Dec. 10, 1946 |